(12) United States Patent
Wu et al.

(10) Patent No.: US 10,060,597 B2
(45) Date of Patent: Aug. 28, 2018

(54) OPTICAL LENS, BACKLIGHT MODULE AND DISPLAY DEVICE

(71) Applicants: Radiant Opto-Electronics (Suzhou) Co., Ltd., Jiangsu (CN); Radiant Opto-Electronics Corporation, Kaohsiung (TW)

(72) Inventors: Tsung-Tse Wu, Kaohsiung (TW); Chun-Hsien Li, Kaohsiung (TW); Pei-Ling Kao, Kaohsiung (TW); Yen-Chang Lee, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 36 days.

(21) Appl. No.: 15/029,632

(22) PCT Filed: Dec. 29, 2015

(86) PCT No.: PCT/CN2015/099418
§ 371 (c)(1),
(2) Date: Apr. 15, 2016

(87) PCT Pub. No.: WO2016/192386
PCT Pub. Date: Dec. 8, 2016

(65) Prior Publication Data
US 2017/0261179 A1    Sep. 14, 2017

(30) Foreign Application Priority Data

Jun. 5, 2015  (CN) .......................... 2015 1 0306611

(51) Int. Cl.
G09F 13/04    (2006.01)
F21V 5/04     (2006.01)
(Continued)

(52) U.S. Cl.
CPC ............... F21V 5/04 (2013.01); F21V 5/002 (2013.01); G02F 1/133602 (2013.01);
(Continued)

(58) Field of Classification Search
CPC ................................... F21V 5/04; F21V 5/002
(Continued)

(56) References Cited

U.S. PATENT DOCUMENTS

2007/0296094 A1    12/2007  Jiang et al.
2012/0069579 A1     3/2012  Koh et al.
(Continued)

FOREIGN PATENT DOCUMENTS

CN    102141215 A    8/2011
CN    102147077 A    8/2011
(Continued)

*Primary Examiner* — Anh Mai
*Assistant Examiner* — Meghan Ulanday
(74) *Attorney, Agent, or Firm* — CKC & Partners Co., Ltd.

(57) ABSTRACT

An optical lens, a backlight module and a display device are provided. The optical lens includes a main body, a light-incident surface, a reflecting surface and a light-emitting surface. The main body has a top portion and a bottom portion. The light-incident surface is recessed into the bottom portion of the main body. The reflecting surface is recessed into the top portion of the main body and opposite to the light-incident surface. The light-emitting surface connects the top portion and the bottom portion, in which the light-emitting surface has plural microstructures. Each of the microstructures has a normal line, and directions of the normal lines are different from each other.

18 Claims, 11 Drawing Sheets

(51) Int. Cl.
*F21V 5/00* (2018.01)
*G02F 1/1335* (2006.01)
*G02B 3/00* (2006.01)

(52) U.S. Cl.
CPC .......... *G02B 3/00* (2013.01); *G02F 1/133606* (2013.01); *G02F 2001/133607* (2013.01)

(58) Field of Classification Search
USPC ........................................................ 362/97.1
See application file for complete search history.

(56) References Cited

U.S. PATENT DOCUMENTS

| | | | | |
|---|---|---|---|---|
| 2012/0275139 | A1* | 11/2012 | Chen | .................... G02B 6/0025 362/97.2 |
| 2015/0129912 | A1* | 5/2015 | Wang | ..................... H01L 33/58 257/98 |

FOREIGN PATENT DOCUMENTS

| | | |
|---|---|---|
| CN | 202733781 U | 2/2013 |
| CN | 103090311 A | 5/2013 |
| CN | 203349065 U | 12/2013 |
| CN | 104421832 A | 3/2015 |
| CN | 204806286 U | 11/2015 |
| TW | 201243453 A | 11/2012 |
| TW | 201428392 A | 7/2014 |
| TW | 201500775 A | 1/2015 |

* cited by examiner

OPTICAL LENS, BACKLIGHT MODULE AND DISPLAY DEVICE

RELATED APPLICATIONS

This application is the U.S. national phase under § 371 of International Application No. PCT/CN2015/099418 filed Dec. 29, 2015, which claims priority from China Patent Application Serial Number 201510306611.3, filed Jun. 5, 2015. The entire contents of each of which are incorporated by reference.

BACKGROUND

Field of Invention

The present invention relates to an optical element. More particularly, the present invention relates to an optical lens, a backlight module and a display device.

Description of Related Art

In order to meet the requirements of lightness and thinness for a direct type backlight module, a conventional method is to decrease a light-mixing distance of a secondary lens in the direct type backlight modules or to increase the number of the light-emitting diodes disposed therein.

The secondary lens mainly includes a refracting type lens and a reflecting type lens. A light-emitting angle of the refracting type lens is only about 75 degrees, and thus, the too large distance between any two adjacent light-emitting diodes (i.e. a LED pitch) will result in the problem of poor illumination uniformity. On the other hand, although the light-emitting angle of the reflecting type lens is larger than 90 degrees, yet the light-incident surface and the light-emitting surface of the reflecting type lens have to be designed as complicated curved surfaces. Because the formation of the complicated curved surfaces requires high accuracy, the manufacturing cost thereof is expensive. In addition, the reflecting type lens cannot be formed accurately due to the complicated curved surfaces, thus affecting its light-emitting effect.

SUMMARY

One object of the present invention is to provide an optical lens, a backlight module and a display device, which are easy to manufacture and have better illumination uniformity.

According to the aforementioned object, an optical lens is provided. The optical lens includes a main body, a light-incident surface, a reflecting surface and a light-emitting surface. The main body has a top portion and a bottom portion. The light-incident surface is recessed into the bottom portion of the main body. The reflecting surface is recessed into the top portion of the main body and opposite to the light-incident surface. The light-emitting surface connects the top portion and the bottom portion, in which the light-emitting surface has plural microstructures. Each of the microstructures has a normal line, and directions of the normal lines are different from each other.

According to an embodiment of the present invention, edges of any two adjacent of microstructures are connected to each other.

According to an embodiment of the present invention, the light-emitting surface is formed by connecting the microstructures together.

According to an embodiment of the present invention, the light-emitting surface further includes at least one optical surface unit, and the light-emitting surface is formed by connecting the microstructures and the optical surface unit together.

According to an embodiment of the present invention, the optical surface unit has a constant slope.

According to an embodiment of the present invention, the main body has a central line, and the microstructures are arranged around the central line to form a plurality of microstructure rows.

According to an embodiment of the present invention, each of the microstructure rows is annular, semi-annular or arc-shaped.

According to an embodiment of the present invention, the main body has a central line. The microstructures are arranged to form plural microstructure rows, and the microstructure rows are arranged radially with respect to the central line.

According to an embodiment of the present invention, each of the microstructure rows is connected to the top portion and/or the bottom portion.

According to an embodiment of the present invention, both ends of each of the microstructure rows are not connected to the top portion and the bottom portion.

According to an embodiment of the present invention, the reflecting surface is a multiple-curvature surface.

According to an embodiment of the present invention, the reflecting surface has a constant slope.

According to an embodiment of the present invention, the light-incident surface has a constant slope.

According to the aforementioned object, a backlight module is provided. The backlight module includes a back plate, a reflector, an optical plate, at least one light source and the aforementioned optical lens. The reflector is disposed on the back plate. The optical plate is disposed above the reflector. The light source is disposed on the back plate, in which the light source is used to provide light beam. The optical lens is disposed on the light source. Therefore, after entering the main body of the optical lens from the light-incident surface, the light beam provided by the light source is reflected by the reflecting surface, and is emitted out from the light-emitting surface and then is emitted out from the optical plate.

According to an embodiment of the present invention, the reflector has at least one engaging portion, the optical lens is engaged with the engaging portion. The light source includes a circuit board and at least one light-emitting unit disposed on the circuit board, in which the circuit board is disposed on the back plate, and the light-emitting unit is disposed under the optical lens.

According to an embodiment of the present invention, the main body further includes a light-incident space. Moreover, the light-incident surface is an inner surface of the light-incident space, and the light-emitting unit is disposed under the light-incident space.

According to an embodiment of the present invention, the main body has at least one connecting pin disposed on the bottom portion, and the optical lens is disposed on the circuit board through the connecting pin so as to form an accommodating space between the optical lens and the circuit board.

According to the aforementioned object, a display device is provided. The display device includes a back plate, a reflector, an optical plate, at least one light source, the aforementioned optical lens and a display panel. The reflector is disposed on the back plate. The optical plate disposed above the reflector. The light source is disposed on the back plate, in which the light source is used to provide light beam. The optical lens is disposed on the light source. Therefore, after entering the main body of the optical lens from the light-incident surface, the light beam provided by the light source is reflected by the reflecting surface, and is emitted out from the light-emitting surface and then is emitted out from the optical plate. The display panel is disposed above the optical plate.

According to the above embodiments, the optical lens of the invention has a light-emitting surface which is formed by connecting the microstructures with different extending directions of normal lines together, so that the propagation paths of the light beam can be adjusted, and the light-emitting angles can be controlled accordingly. In addition, the propagation paths of the light beam can also be locally controlled by changing the arrangement manners, sizes or shapes of the microstructures. Therefore, the number of the optical lenses applied to the backlight module or the display device, and the overall thickness of the backlight module can be reduced, and the illumination uniformity of the backlight module or the display device can be enhanced. In addition, the light-incident surface or the reflecting surface of each of the optical lenses in the present invention can be designed to have a constant slope, thereby simplifying the manufacture process of the optical lenses, thus increasing forming accuracy of the optical lenses.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
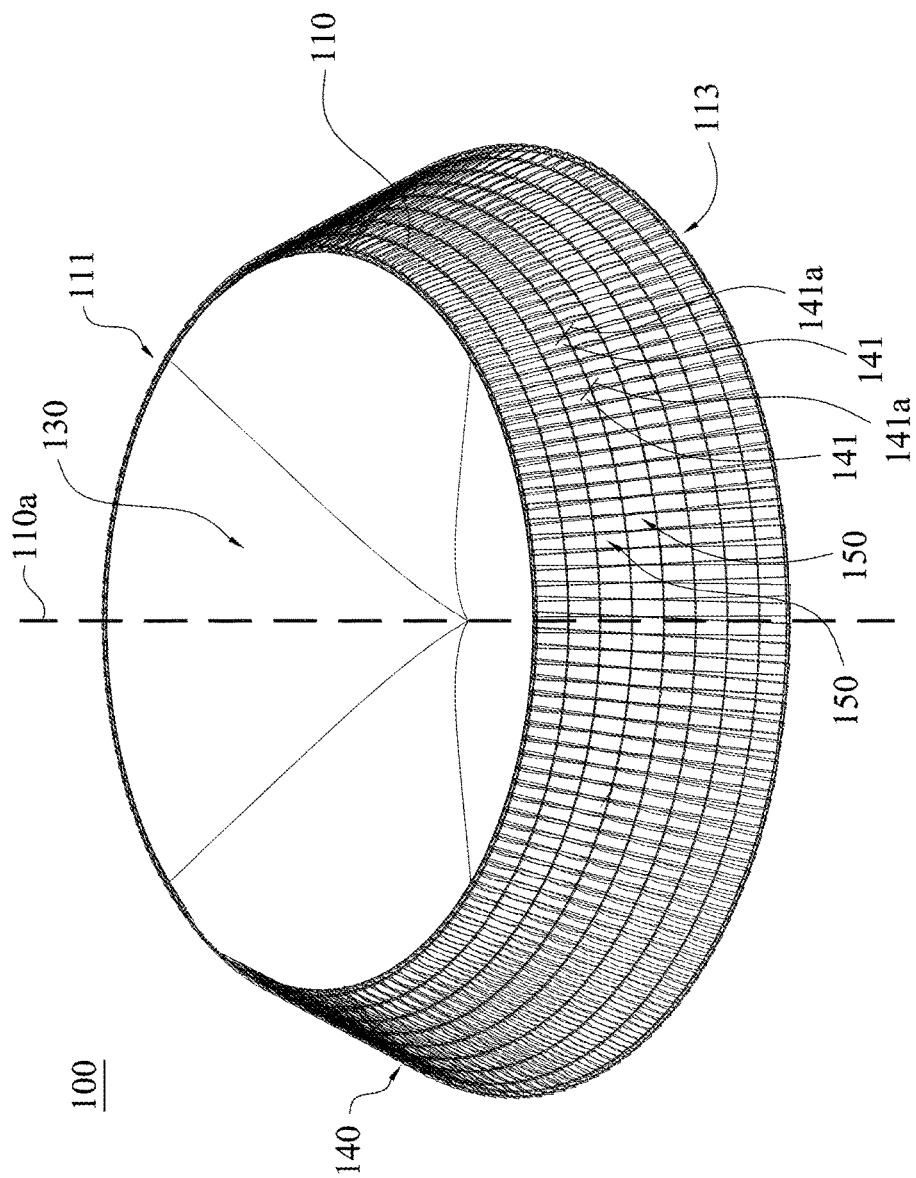
FIG. 1A is a schematic structural diagram showing an optical lens in accordance with a first embodiment of the present invention.
Figure 1B:
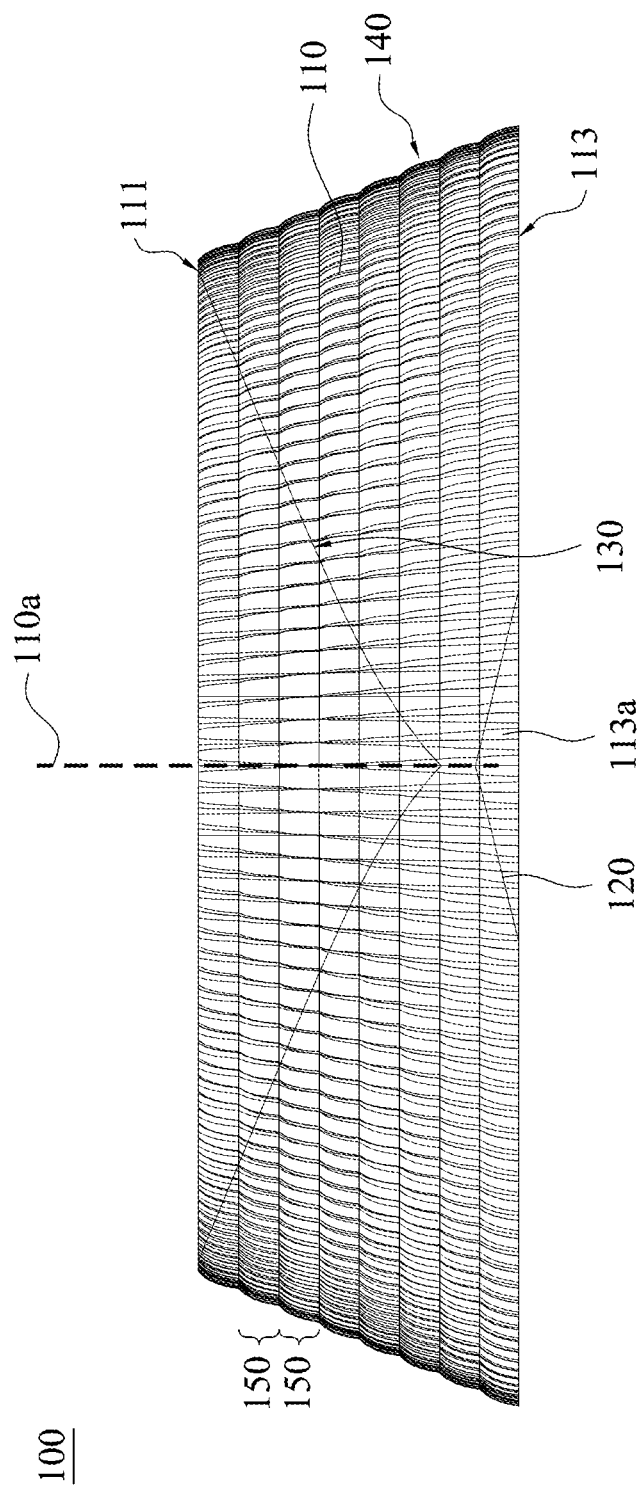
FIG. 1B is a schematic side view of the optical lens in accordance with the first embodiment of the present invention.

Referring to FIGS. 1A and 1B, FIGS. 1A and 1B are a schematic structural diagram and a schematic side view showing an optical lens 100 in accordance with a first embodiment of the present invention. The optical lens 100 of the present embodiment can be applied to a backlight module, so as to increase and adjust light-emitting angles of light-emitting diodes in the backlight module, enlarge illumination range, and increase degrees of illumination uniformity of the backlight module.

Figure 1C:
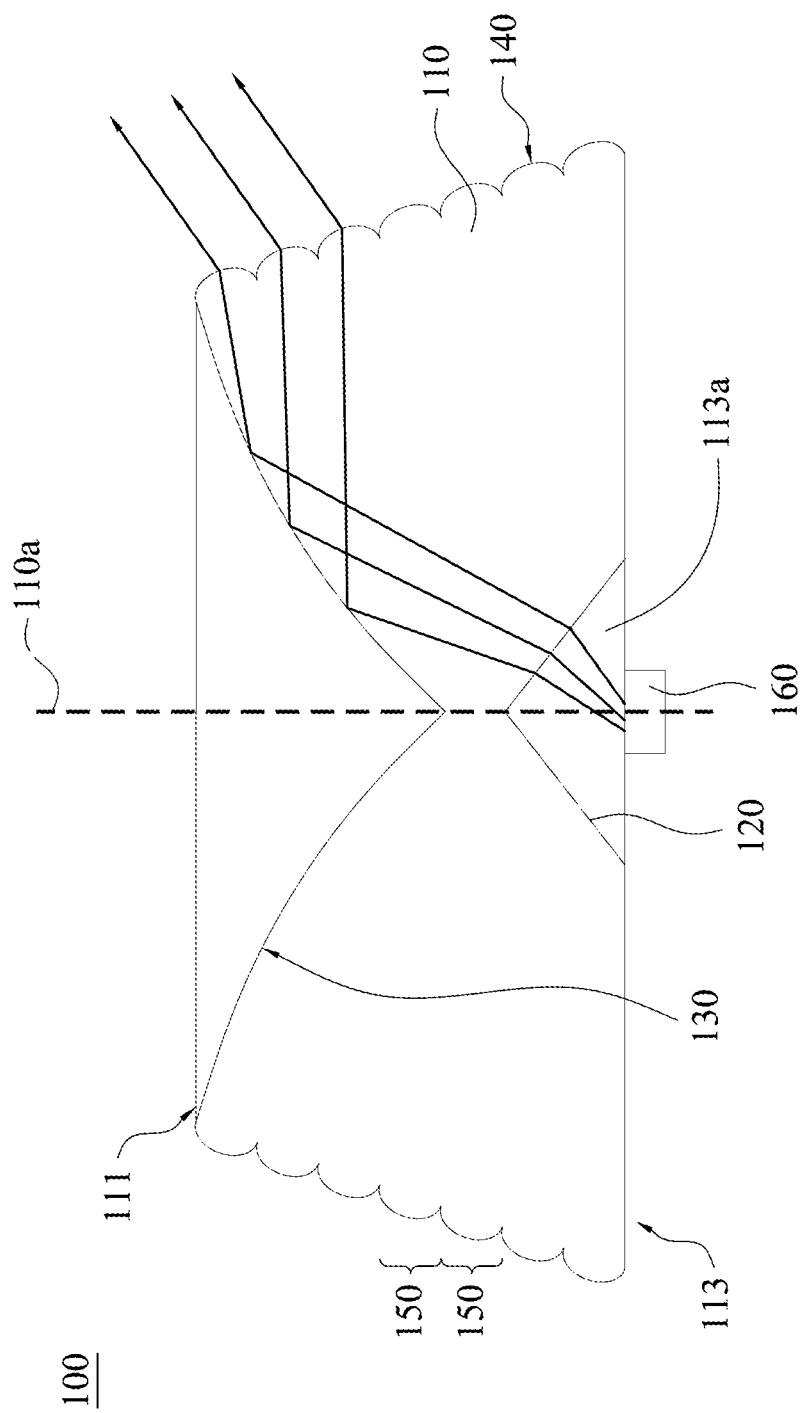
FIG. 1C is a schematic diagram showing an optical path of the optical lens in accordance with the first embodiment of the present invention.

Referring to FIG. 1A and FIG. 1B again, the optical lens 100 mainly includes a main body 110, a light-incident surface 120, a reflecting surface 130 and a light-emitting surface 140. The main body 110 has a top portion 111 and a bottom portion 113 opposite to each other. The light-incident surface 120 is recessed into the bottom portion 113 of the main body 110, and a light-incident space 113a is formed in the bottom portion 113. In other words, the light-incident surface 120 is defined as an inner surface of the light-incident space 113a. Referring to FIG. 1C, FIG. 1C is a schematic diagram showing an optical path of the optical lens 100 in accordance with the first embodiment of the present invention. It is noted that, in order to clearly illustrate the optical path of the optical lens, microstructures 141 are not illustrated in FIG. 1C. As shown in FIG. 1C, a light source 160 is disposed under the light-incident space 113a of the main body 110, and light beam provided by the light source 160 can enter the main body 110 from the light-incident surface 120. In one embodiment, the light-incident surface 120 has a constant slope, which can be easily processed.

As shown in FIG. 1A to FIG. 1C, the reflecting surface 130 is recessed into the top portion 111 of the main body 110. Moreover, the reflecting surface 130 is opposite to the light-incident surface 120. Therefore, after entering the main body 110 from the light-incident surface 120 and emitted towards the reflecting surface 130, the light beam is reflected by the reflecting surface 130 and emitted out from the light-emitting surface 140. In some embodiments, the reflecting surface 130 has a constant slope. In other embodiments, the reflecting surface 130 can be a multiple-curvature surface, so as to meet different requirements.

As shown in FIG. 1A to FIG. 1O, the light-emitting surface 140 has plural microstructures 141, and edges of any two adjacent of microstructures 141 are connected to each other. In other words, the light-emitting surface 140 is formed by connecting the microstructures 141 together. In the present embodiment, each of the microstructures 141 has a normal line 141a. Moreover, extending directions of these normal lines 141a are different from each other. In other words, these microstructures 141 can be different inclined surfaces or curved surfaces. It is noted that, the term "normal lines" as used herein refers to lines vertical to each microstructure 141. Moreover, extending directions of the normal lines of the microstructures 141 with different slopes or curvatures are different. Therefore, when the light beam passes through the microstructures 141, these microstructures 141 with different slopes or curvatures can respectively refract the light beam to change the propagation paths of the light beam, so as to enlarge illumination range and increase illumination uniformity.

As shown in FIG. 1A to FIG. 1C, the main body 110 has a central line 110a, and the central line passes through the top portion 111 and the bottom portion 113 of the main body 110 perpendicularly. In the present embodiment, the microstructures 141 are arranged around the central line 110a to form a plurality of microstructure rows 150. In one example, as shown in FIG. 1A to FIG. 1C, each of the microstructure rows 150 is annular. Moreover, the light-emitting surface 140 is formed by connecting the microstructure rows 150 together. In other examples, each of the microstructure rows can be designed in semi-annular or arc-shaped according to different requirements.

Figure 2:
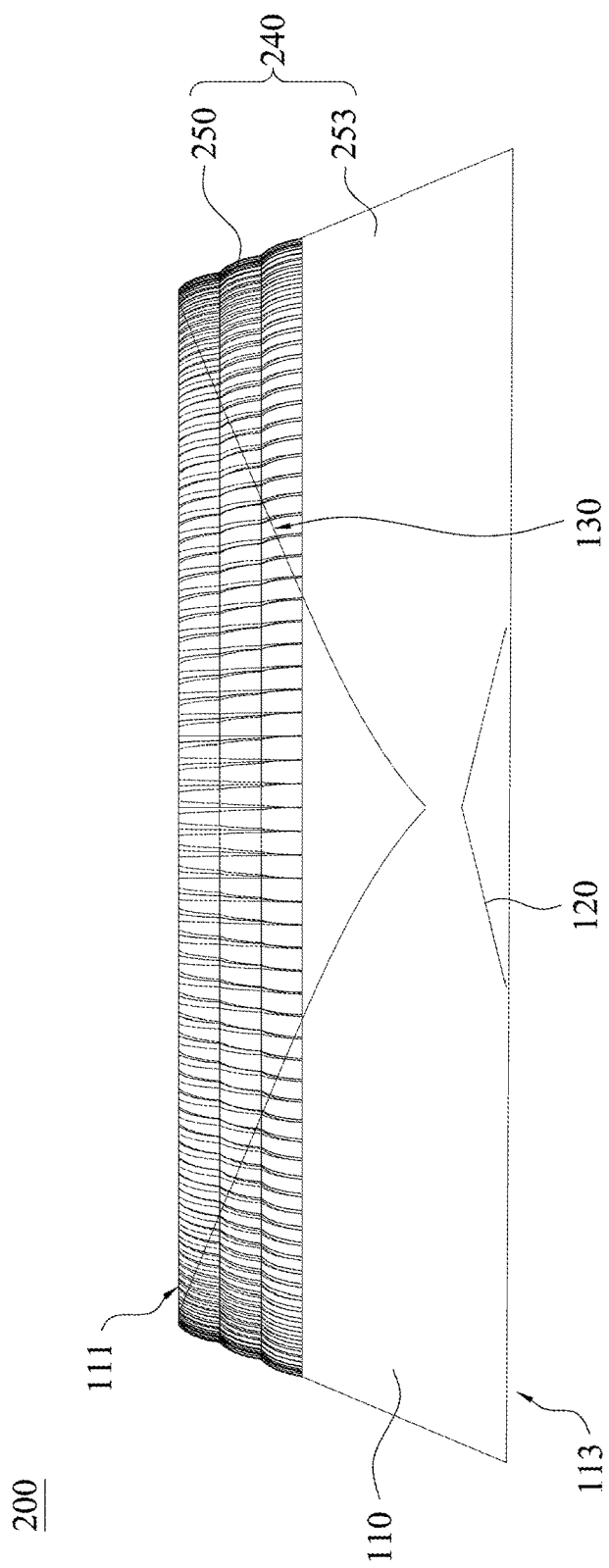
FIG. 2 is a schematic side view of an optical lens in accordance with a second embodiment of the present invention.

It is noted that, in the embodiment shown in FIG. 1A to FIG. 1C, the light-emitting surface 140 of the optical lens 100 is formed by connecting the microstructure rows 150 to each other. In other embodiments, the light-emitting surface 140 may have different designs. Referring to FIG. 2, FIG. 2 is a schematic side view of an optical lens 200 in accordance with a second embodiment of the present invention. The structure of the optical lens 200 shown in FIG. 2 is similar to that of the aforementioned optical lens 100, and the main difference therebetween is that a light-emitting surface 240 of the optical lens 200 is formed by connecting plural annular microstructure rows 250 and an optical surface unit 253 together. In other words, one portion of the light-emitting surface 240 has the microstructure rows 250, and the other portion of the light-emitting surface 240 without the microstructure rows 250 is defined as the optical surface unit 253. Therefore, the microstructure rows 250 and the optical surface unit 253 can control the propagation paths of the light beam in different layers.

It is noted that, the embodiment shown in FIG. 2 showing that the microstructure rows 250 are disposed adjacent to the top portion 111 of the main body 110, is merely used as an example for explanation, and other embodiments of the present invention are not limited thereto. In other embodiments, the microstructure rows 250 can be disposed adjacent to the bottom portion 113, or the microstructure rows 250 can be disposed between the top portion 111 and the bottom portion 113 according to different requirements. In addition, in some embodiments, the optical surface unit 253 has a constant slope, but not limited thereto.

Figure 3:
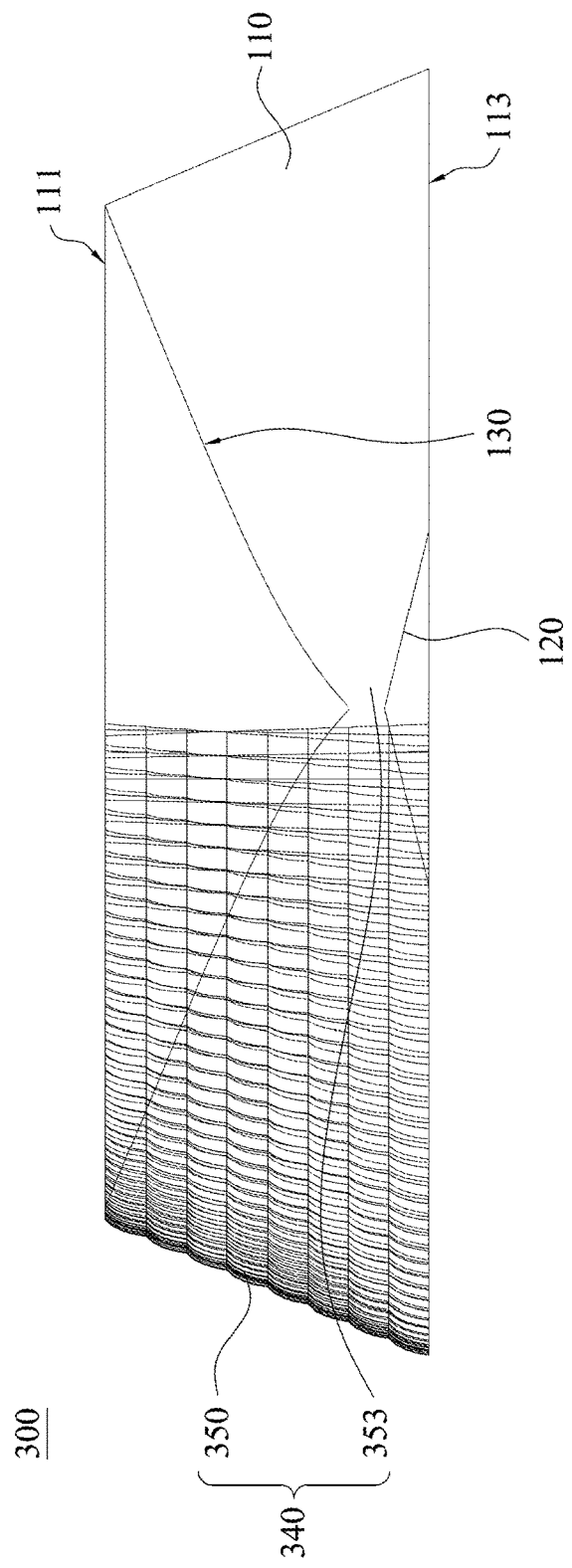
FIG. 3 is a schematic side view of an optical lens in accordance with a third embodiment of the present invention.

Referring to FIG. 3, FIG. 3 is a schematic side view of an optical lens 300 in accordance with a third embodiment of the present invention. The structure of the optical lens 300 shown in FIG. 3 is similar to that of the aforementioned optical lens 200, and a light-emitting surface 340 of the optical lens 300 is also formed by connecting plural microstructure rows 350 and an optical surface unit 353 together. The main difference between the optical lens 300 and the optical lens 200 is that each of the microstructure rows 350 of the optical lens 300 is semi-annular, thereby achieving an object of locally controlling the propagation paths of the light beam.

It is noted that, the spaces, disposition positions and number of the microstructure rows 350 shown in FIG. 3 are not used to limit the present invention. In some embodiments, each of the microstructure rows 350 is arc-shaped. In other embodiments, the microstructure rows 350 can be disposed on the main body 110 adjacent to the top portion 111 or the bottom portion 113, or the microstructure rows 350 can be disposed between the top portion 111 and the bottom portion 113.

Figure 4:
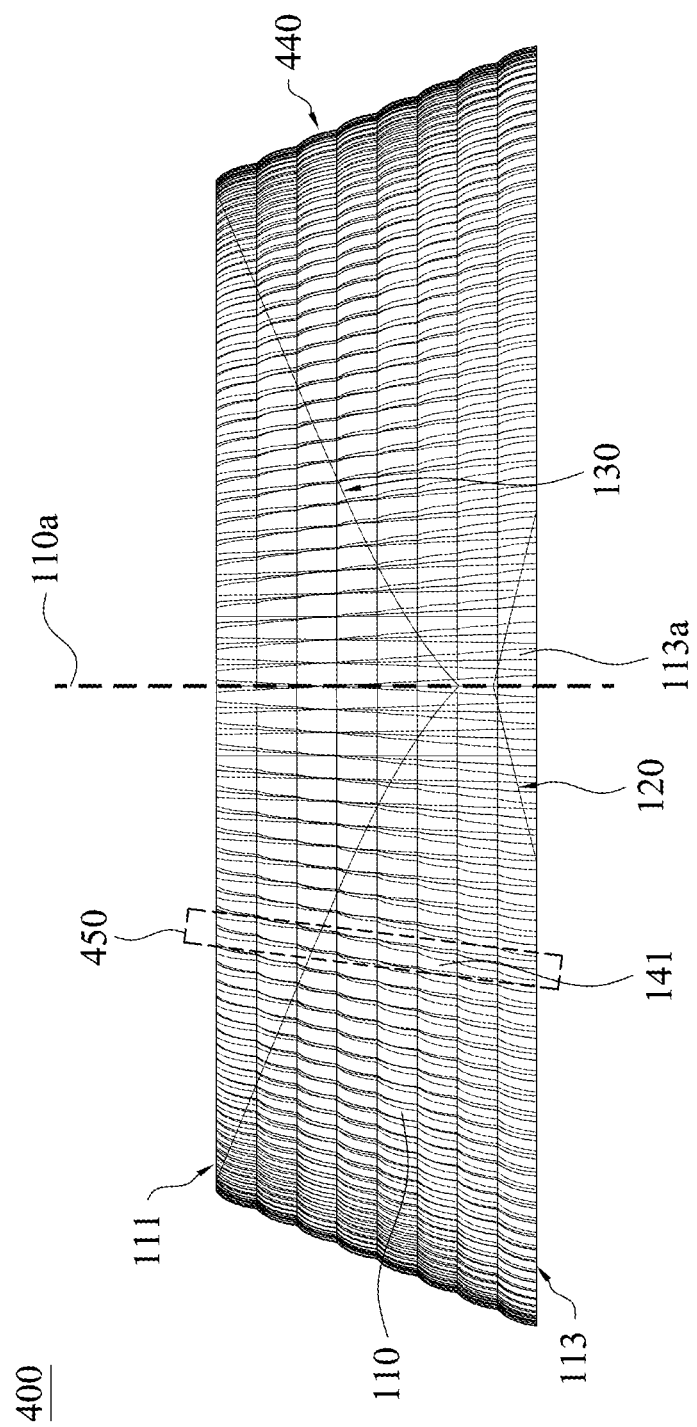
FIG. 4 is a schematic side view of an optical lens in accordance with a fourth embodiment of the present invention.

Referring to FIG. 4, FIG. 4 is a schematic side view of an optical lens 400 in accordance with a fourth embodiment of the present invention. The structure of the optical lens 400 shown in FIG. 4 is similar to that of the aforementioned optical lens 100, and the main difference therebetween is that each of the microstructure rows 450 of the optical lens 400 is strip-shaped. In the present embodiment, the microstructure rows 450 are arranged radially with respect to the central line 110a, and each of the microstructure rows 450 extends from the top portion 111 of the main body 110 to the bottom portion 113. Moreover, a light-emitting surface 440 of the optical lens 400 is formed by connecting the microstructure rows 450 together, so as to control the propagation paths of the light beam.

Figure 5:
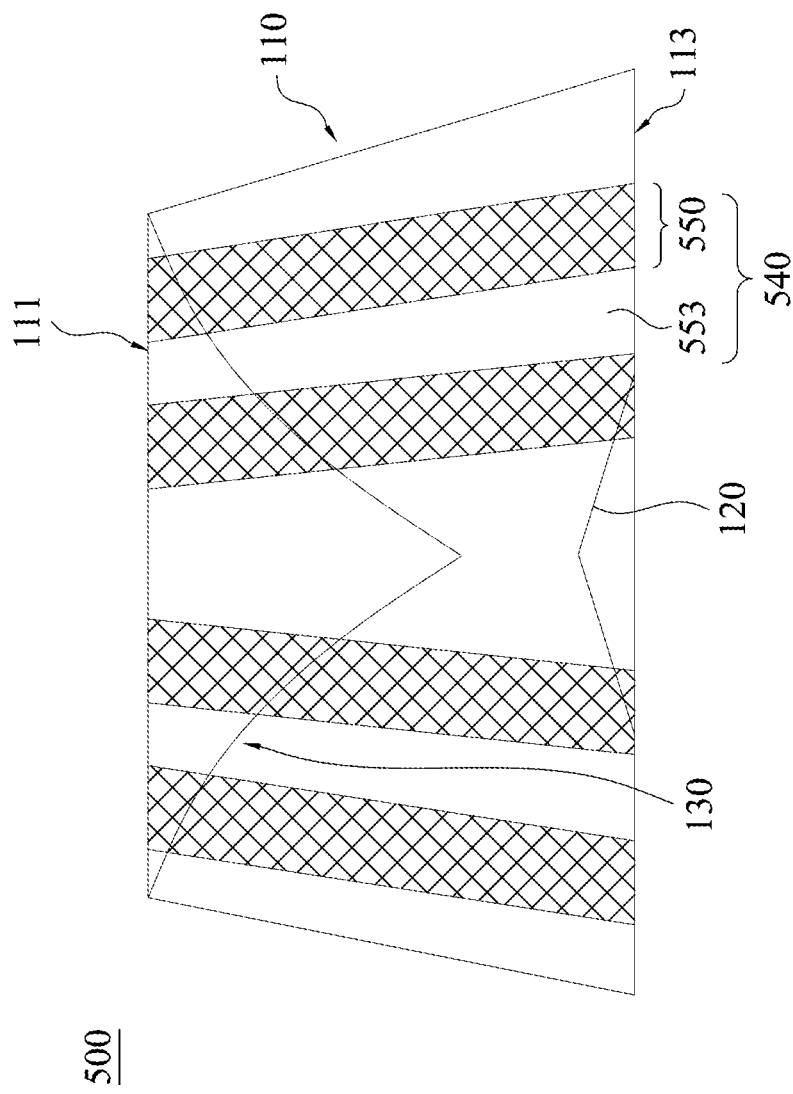
FIG. 5 is a schematic side view of an optical lens in accordance with a fifth embodiment of the present invention.

It is noted that, the light-emitting surface 440 of the optical lens 400 shown in FIG. 4 is formed by connecting the microstructure rows 450 together. In other embodiments, the light-emitting surface 440 can have different designs. Referring to FIG. 5, FIG. 5 is a schematic side view of an optical lens 500 in accordance with a fifth embodiment of the present invention. The structure of the optical lens 500 is similar to that of the aforementioned optical lens 400, and the main difference therebetween is that a light-emitting surface 540 of the optical lens 500 is formed by connecting plural strip-shaped microstructure rows 550 and an optical surface unit 553. In other words, one portion of the light-emitting surface 540 has the microstructure rows 550, and the other portion of the light-emitting surface 540 without the microstructure rows 550 is defined as the optical surface unit 553. Therefore, the microstructure rows 550 and the optical surface unit 553 can control the propagation paths of the light beam in different layers.

It is noted that, as shown in FIG. 5, two ends of each of the microstructure rows 550 are respectively connected to the top portion 111 and the bottom portion 113 of the main body 110. In some embodiments, both ends of each of the microstructure rows 550 are not connected to the top portion 111 and the bottom portion 113. In other embodiments, one end of each of the microstructure rows 550 is connected to the top portion 111, the other end of each of the microstructure rows 550 is not connected to the bottom portion 113. Similarly, in other embodiments, one end of each of the microstructure rows 550 is not connected to the top portion 111, the other end of each of the microstructure rows 550 is connected to the bottom portion 113.

Figure 6A:
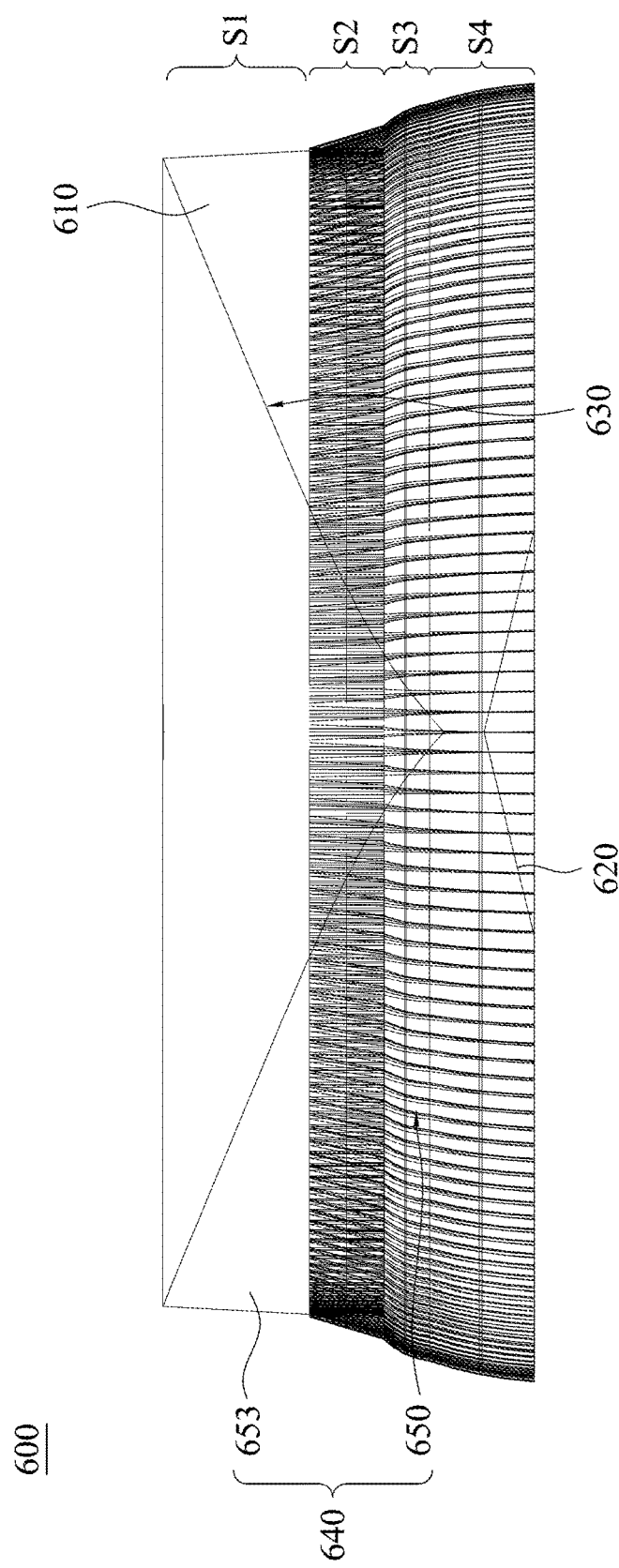
FIG. 6A is a schematic side view of an optical lens in accordance with a sixth embodiment of the present invention.

Referring to FIG. 6A, FIG. 6A is a schematic side view of an optical lens 600 in accordance with a sixth embodiment of the present invention. The optical lens 600 mainly includes a main body 610, a light-incident surface 620, a reflecting surface 630 and light-emitting surface 640. In the present embodiment, the main body 610 is a stepped structure which has a first segment S1, a second segment S2, a third segment S3 and a fourth segment S4. The light-emitting surface 640 is formed by connecting plural annular microstructure rows 650 and an optical surface unit 653 together. Therefore, the microstructure rows 650 and the optical surface unit 653 can control the propagation paths of the light beam in different layers.

As shown in FIG. 6A, the optical surface unit 653 is disposed on the first segment S1, the microstructure rows 650 are disposed on the second segment S2, third segment S3 and fourth segment S4. Moreover, sizes and shapes of the microstructure rows 650 can be designed corresponding to sizes of the second segment S2, third segment S3 and fourth segment S4. It is noted that each of the microstructure rows 650 which is annular, is not used to limit the present invention. In other embodiments, each of the microstructure rows 650 can be designed in semi-annular, arc-shaped or strip-shaped. In addition, shapes of the main body 610, number of the segments, or disposition positions of the microstructure rows 650 and the optical surface unit 653 can be varied according to the requirements.

Figure 6B:
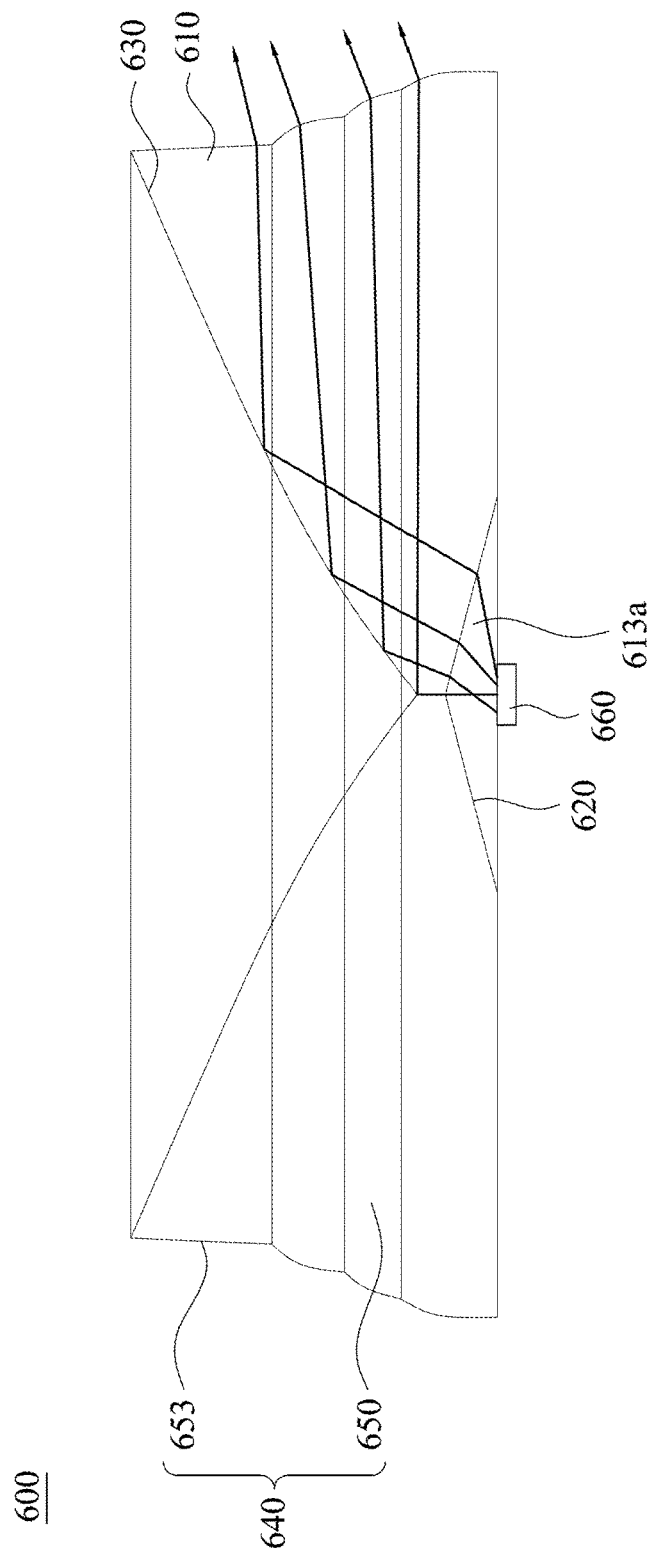
FIG. 6B is a schematic diagram showing an optical path of the optical lens in accordance with the sixth embodiment of the present invention.

Referring to FIG. 6A and FIG. 6B, FIG. 6B is a schematic diagram showing an optical path of the optical lens 600 in accordance with the sixth embodiment of the present invention. It is noted that, in order to clearly illustrate the optical path of the optical lens, microstructure rows 650 are simply illustrated in FIG. 6B. As shown in FIG. 6B, a light source 660 is disposed under a light-incident space 613a of the main body 610. Therefore, after entering the main body 610 from the light-incident surface 620, light beam provided by the light source 660 is reflected by the reflecting surface 630 and emitted out from the light-emitting surface 640. When the light beam passes through the microstructure rows 650 and the optical surface unit 653, these microstructure rows 650 and the optical surface unit 653 can respectively refract the light beam to change the propagation paths of the light beam, so as to enlarge illumination range and increase illumination uniformity of the light source 660.

Figure 7:
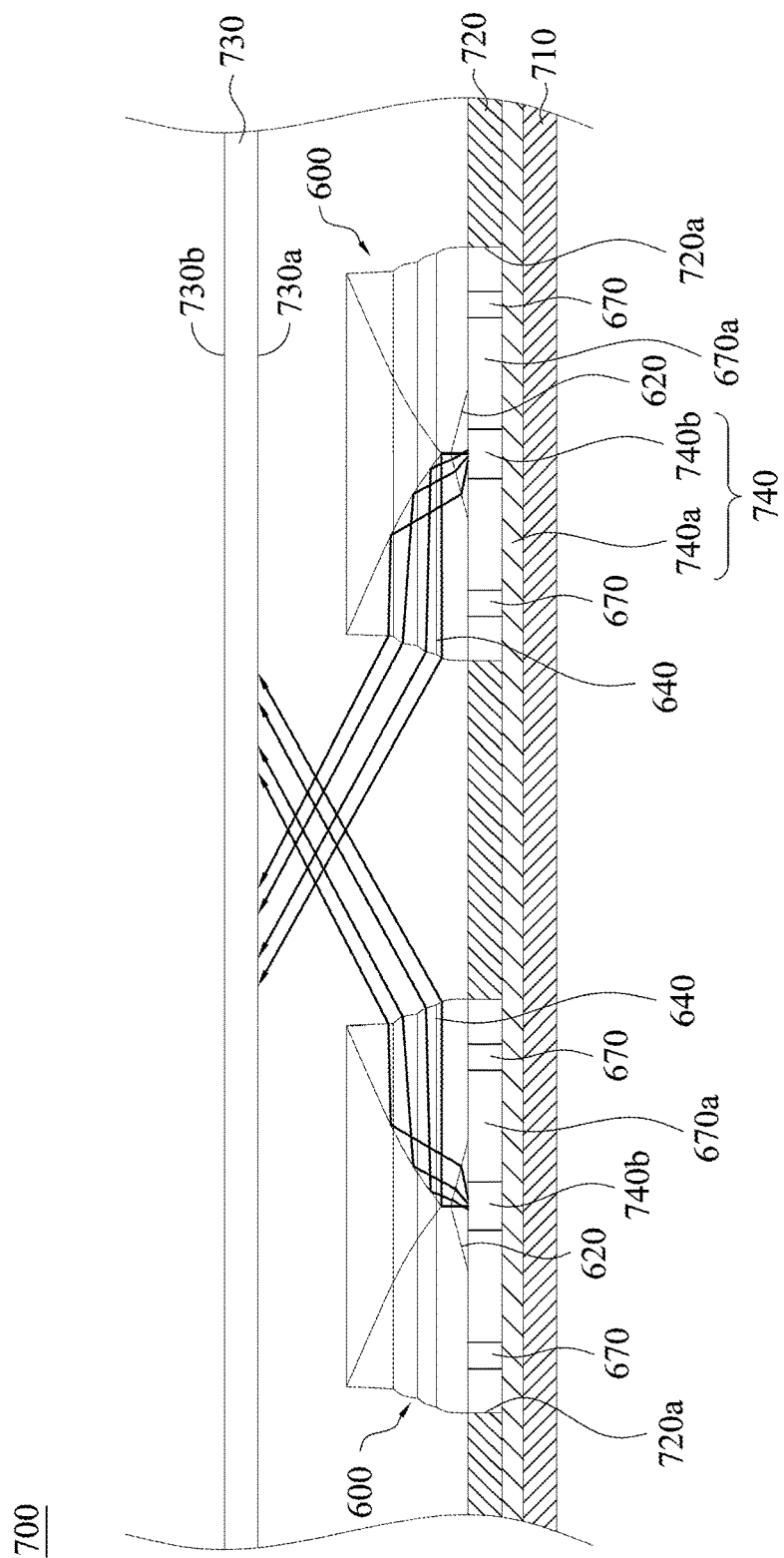
FIG. 7 is a schematic structural diagram showing a backlight module in accordance with an embodiment of the present invention.

Simultaneously referring to FIG. 6B and FIG. 7, FIG. 7 is a schematic structural diagram showing a backlight module 700 in accordance with an embodiment of the present invention. The backlight module 700 of the present embodiment includes a back plate 710, a reflector 720, an optical plate 730, at least one light source 740 and at least one optical lens 600. It is noted that, the optical lens 600 is merely used as an example for explanation in the present embodiment. In other embodiments, other optical lenses also can be applied to the backlight module 700. In some embodiments, the backlight module 700 is a direct type backlight module, and the aforementioned optical plate 730 is a diffusing plate. In other embodiments, the backlight module 700 is an edge-type backlight module, and the aforementioned optical plate 730 is a light guide plate.

Referring to FIG. 7 again, the light source 740 is disposed on the back plate 710. The light source 740 includes a circuit board 740a and at least one light-emitting unit 740b disposed on the circuit board 740a. The number of the optical lens 600 is corresponding to that of the light-emitting unit 740b, and the optical lens 600 is correspondingly disposed above the light-emitting unit 740b. In some embodiments, the optical lens 600 has at least one connecting pin 670 disposed on a bottom portion of the optical lens 600. Therefore, the optical lens 600 can be disposed on the circuit board 740a through the connecting pin 670, and an accommodating space 670a is formed between the optical lens 600 and the circuit board 740a accordingly. Therefore, the light-emitting unit 740b can be disposed in the accommodating space 670a and be located under the light-incident surface 620 of the optical lens 600.

As shown in FIG. 7, the reflector 720 has plural engaging portions which are configured as through holes 720a in this embodiment. Therefore, the reflector 720 can be mounted on the optical lens 600 through the through holes 720a. The optical plate 730 is disposed above the reflector 720 and has a first surface 730a and a second surface 730b. The first surface 730a is a light-incident surface, and the second surface 730b is a light-emitting surface. Therefore, after entering the main body 610 from the light-incident surface 620 of the optical lens 600, light beam provided by the light source 740 is reflected by the reflecting surface 630 and emitted out from the light-emitting surface 640. After being emitted out from the light-emitting surface 640 of the optical lens 600, one portion of the light beam enters the optical plate 730 from the first surface 730a and is emitted out from the second surface 730b, and the other portion of the light beam is reflected by the reflector 720 and emitted out from the optical plate 730. It can be seen from the above description that after the light beam is reflected and refracted by the optical lens 600, light-emitting angle of the light beam will be increased. Therefore, when the number of the light sources 740 is reduced to increase the distance between any two adjacent light sources 740, light beam generated by the light source 740 still can be adequately mixed therebetween, so that the thickness and weight of the backlight module 700 can be decreased, and the illumination uniformity of the backlight module 700 can be maintained or even be enhanced.

Figure 8:
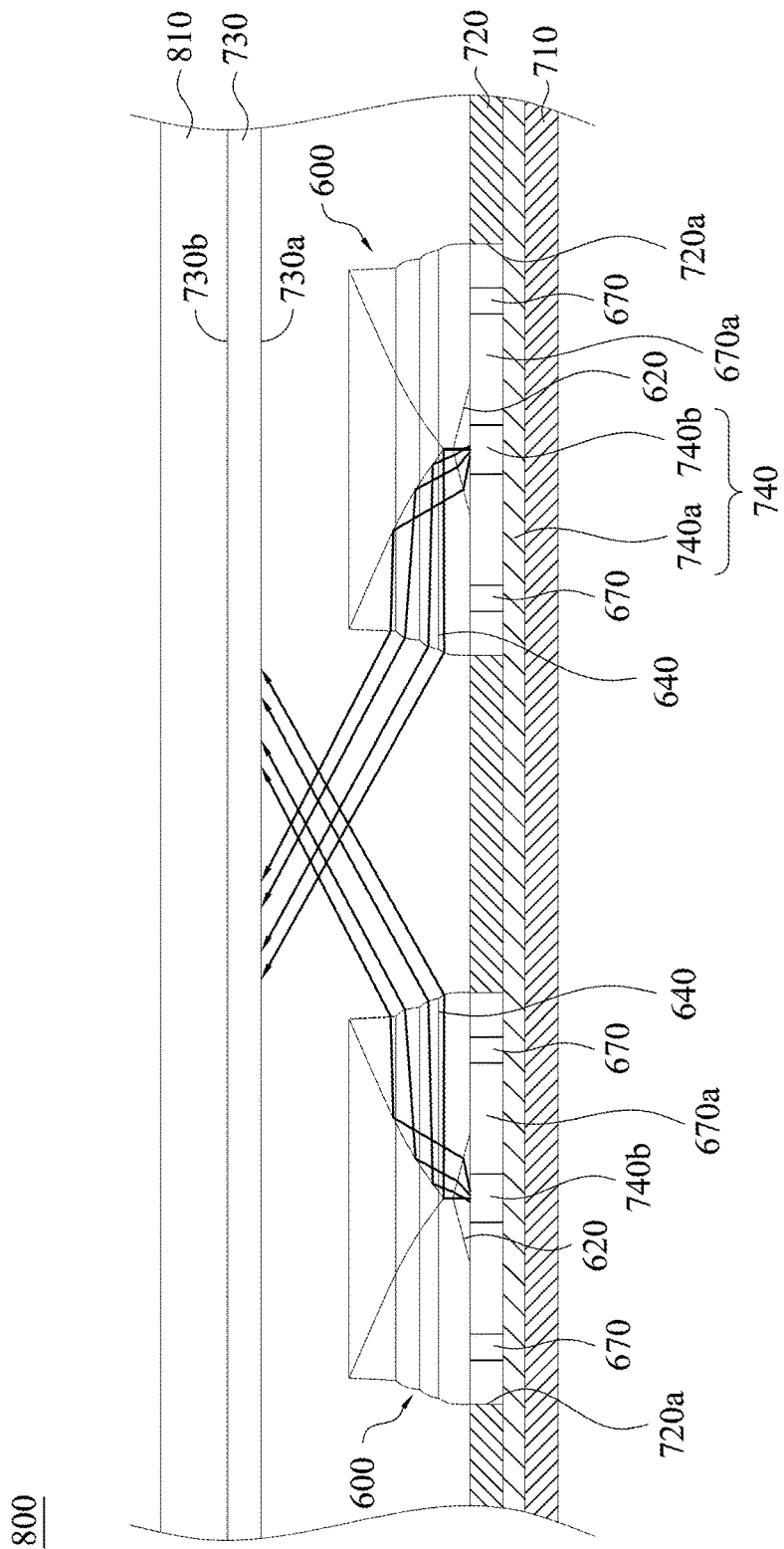
FIG. 8 is a schematic structural diagram showing a display device in accordance with an embodiment of the present invention.

Referring to FIG. 8, FIG. 8 is a schematic structural diagram showing a display device 800 in accordance with an embodiment of the present invention. The display device 800 in the present embodiment includes a backlight module 700 and a display panel 810. As shown in FIG. 8, the display panel 810 is disposed above the optical plate 730 of the backlight module 700. Light beam emitted from the second surface 730b of the optical plate 730 can enter the display panel 810, so as to achieve the aforementioned objects.

According to the aforementioned embodiments of the present invention, the optical lens of the invention has a light-emitting surface which is formed by connecting the microstructures with different extending directions of normal lines together, so that the propagation paths of the light beam can be adjusted, and the light-emitting angles can be controlled accordingly. In addition, the propagation paths of the light beam can also be locally controlled by changing the arrangement manners, sizes or shapes of the microstructures. Therefore, the number of the optical lenses applied to the backlight module or the display device, and the overall thickness of the backlight module can be reduced, and the illumination uniformity of the backlight module or the display device can be enhanced. In addition, the light-incident surface or the reflecting surface of each of the optical lenses in the present invention can be designed to have a constant slope, thereby simplifying the manufacture process of the optical lenses, thus increasing forming accuracy of the optical lenses.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical lens, comprising:
a main body having a top portion and a bottom portion;
a light-incident surface recessed into the bottom portion of the main body;
a reflecting surface recessed into the top portion of the main body and opposite to the light-incident surface; and
a light-emitting surface connecting the top portion and the bottom portion, wherein the light-emitting surface has a plurality of microstructures, and each of the microstructures has a normal line, and directions of the normal lines are different from each other;
wherein the main body has a central line; and
wherein the light-emitting surface has a plurality of radial ridges with respect to the central line and a plurality of concentrical ridges with respect to the central line, the radial ridges are divided by the concentrical ridges to define each of the microstructures as quadrilateral shapes;
wherein the light-emitting surface is non-parallel to the bottom portion and surrounds the central line to define a conical frustum surface;

wherein the radial ridges and the concentrical ridges are located on the conical frustum surface; and wherein the radial ridges are oriented toward the central line and the central line is surrounded by the concentrical ridges.

2. The optical lens of claim 1, wherein edges of any two adjacent of microstructures are connected to each other.

3. The optical lens of claim 1, wherein the light-emitting surface is formed by connecting the microstructures together.

4. The optical lens of claim 1, wherein the light-emitting surface further comprises at least one optical surface unit, and the light-emitting surface is formed by connecting the microstructures and the optical surface unit together.

5. The optical lens of claim 4, wherein the optical surface unit has a constant slope.

6. The optical lens of claim 1, wherein
the microstructures are arranged around the central line to form a plurality of microstructure rows.

7. The optical lens of claim 6, wherein each of the microstructure rows is annular, semi-annular or arc-shaped.

8. The optical lens of claim 1, wherein
the microstructures are arranged to form a plurality of microstructure rows, and the microstructure rows are arranged radially with respect to the central line.

9. The optical lens of claim 8, wherein each of the microstructure rows is connected to the top portion and/or the bottom portion.

10. The optical lens of claim 8, wherein both ends of each of the microstructure rows are not connected to the top portion and the bottom portion.

11. The optical lens of claim 1, wherein the reflecting surface is a multiple-curvature surface.

12. The optical lens of claim 1, wherein the reflecting surface has a constant slope.

13. The optical lens of claim 1, wherein the light-incident surface has a constant slope.

14. A backlight module, comprising:
a back plate;
a reflector disposed on the back plate;
an optical plate disposed above the reflector;
at least one light source disposed on the back plate, wherein the light source is used to provide light beam; and
an optical lens as claimed in claim 1 disposed on the light source;
wherein, after entering the main body of the optical lens from the light-incident surface, the light beam provided by the light source is reflected by the reflecting surface, and is emitted out from the light-emitting surface and then is emitted out from the optical plate.

15. The backlight module of claim 14, wherein
the reflector has at least one engaging portion, the optical lens is engaged with the engaging portion;
the light source comprises a circuit board and at least one light-emitting unit disposed on the circuit board, wherein the circuit board is disposed on the back plate, and the light-emitting unit is disposed under the optical lens.

16. The backlight module of claim 15, wherein the main body further comprises a light-incident space, the light-incident surface is an inner surface of the light-incident space, and the light-emitting unit is disposed under the light-incident space.

17. The backlight module of claim 15, wherein the main body has at least one connecting pin disposed on the bottom portion, and the optical lens is disposed on the circuit board through the connecting pin so as to form an accommodating space between the optical lens and the circuit board.

18. A display device, comprising:
a back plate;
a reflector disposed on the back plate;
an optical plate disposed above the reflector;
at least one light source disposed on the back plate, wherein the light source is used to provide light beam;
an optical lens as claimed in claim 1 disposed on the light source;
wherein, after entering the main body of the optical lens from the light-incident surface, the light beam provided by the light source is reflected by the reflecting surface, and is emitted out from the light-emitting surface and then is emitted out from the optical plate; and
a display panel disposed above the optical plate.

* * * * *